(12) United States Patent
Ando

(10) Patent No.: US 9,954,928 B2
(45) Date of Patent: Apr. 24, 2018

(54) METHOD AND SYSTEM FOR CAUSING PORTABLE TERMINAL TO OBTAIN SITE PAGE OF WEB SERVER ASSOCIATED WITH CURRENT LOCATION

(71) Applicant: TAP AROUND INC., Warabi, Saitama (JP)

(72) Inventor: Yuta Ando, Tokyo (JP)

(73) Assignee: Tap Around Inc., Saitama (JP)

( * ) Notice: Subject to any disclaimer, the term of this patent is extended or adjusted under 35 U.S.C. 154(b) by 79 days.

(21) Appl. No.: 14/653,364

(22) PCT Filed: Dec. 19, 2013

(86) PCT No.: PCT/JP2013/084121
§ 371 (c)(1),
(2) Date: Jun. 18, 2015

(87) PCT Pub. No.: WO2014/098192
PCT Pub. Date: Jun. 26, 2014

(65) Prior Publication Data
US 2015/0312315 A1    Oct. 29, 2015

(30) Foreign Application Priority Data
Dec. 20, 2012  (JP) ................................ 2012-278443
May 16, 2013  (JP) ................................ 2013-104572

(51) Int. Cl.
*G06F 15/16*    (2006.01)
*H04L 29/08*    (2006.01)
(Continued)

(52) U.S. Cl.
CPC ........ *H04L 67/02* (2013.01); *G06F 17/30887* (2013.01); *H04L 61/2528* (2013.01);
(Continued)

(58) Field of Classification Search
CPC .......... H04L 67/02; H04L 67/28; H04L 61/25
See application file for complete search history.

(56) References Cited

U.S. PATENT DOCUMENTS 6,760,770 B1 *  7/2004  Kageyama .............. H04L 29/06
                                                              709/217
8,014,792 B2   9/2011  Sato et al.
(Continued)

FOREIGN PATENT DOCUMENTS

EP    2 506 606 A1      10/2012
EP    2506606 A1 *     10/2012
(Continued)

OTHER PUBLICATIONS

Extended European Search Report dated Nov. 10, 2015, issued in the counterpart EP Patent Application 13 864 690.6.

*Primary Examiner* — Glenford Madamba
(74) *Attorney, Agent, or Firm* — Carrier Blackman & Associates, P.C.; Joseph P. Carrier; Jingli Wang

(57) ABSTRACT

Provided is a method for a portable terminal to acquire Web site pages related to the current position, without a user selecting a site page. A proxy server includes an address correspondence table in which the addresses of the site pages and access points are associated. The portable terminal searches for the access points in the vicinity, receives annunciation signals including access points' addresses, and measures the reception levels. The portable terminal transmits a page acquisition request to the proxy server. The proxy server searches for the address of the site page corresponding to the address of each access point, using address correspondence table, and transmits list information, where the addresses are arranged in descending order of reception levels, to the portable terminal. The portable terminal presents the list information to the user and transmits page acquisition requests having one or more addresses as destinations to the corresponding site servers.

11 Claims, 13 Drawing Sheets

(51) Int. Cl.
- *H04W 48/16* (2009.01)
- *G06F 17/30* (2006.01)
- *H04L 29/12* (2006.01)
- *H04W 48/20* (2009.01)
- *H04W 48/14* (2009.01)

(52) U.S. Cl.
CPC ............ *H04L 67/28* (2013.01); *H04W 48/16* (2013.01); *H04W 48/14* (2013.01); *H04W 48/20* (2013.01)

(56) References Cited

U.S. PATENT DOCUMENTS

| | | |
|---|---|---|
| 2010/0075697 A1 | 3/2010 | Gupta et al. |
| 2010/0232409 A1* | 9/2010 | Kim .................... H04L 63/101 370/338 |

FOREIGN PATENT DOCUMENTS

| | | |
|---|---|---|
| JP | 2000-184431 A | 6/2000 |
| JP | 2000-187667 A | 7/2000 |
| JP | 2001-134618 A | 5/2001 |
| JP | 2001-238266 A | 8/2001 |
| JP | 2002-297615 A | 10/2002 |
| JP | 2003-330832 A | 11/2003 |
| JP | 2005-027239 A | 1/2005 |
| JP | 2006/013844 A1 | 2/2006 |
| JP | 2007-280363 A | 10/2007 |
| JP | 2009-089003 A | 4/2009 |
| JP | 2009-188922 A | 8/2009 |
| JP | 2011-258086 A | 12/2011 |
| JP | 2005027239 A * | 1/2015 |
| WO | 2012/157275 A1 | 11/2012 |
| WO | WO2012157275 * | 11/2012 |

* cited by examiner

FIG.3A

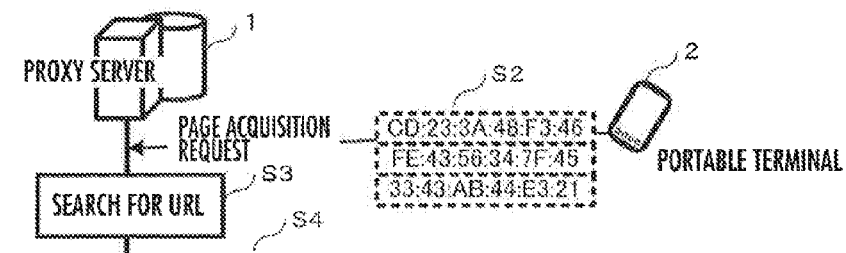

LIST INFORMATION (GENERATION OF HTML SOURCE PROGRAM)

```
<html>
<head>
<meta http-equiv="content-type" content="text/html; charset=utf-8">
<script type="text/javascript">
function ChangeTab(tabname) {
    document.getElementById('AAA').style.display = 'none';
    document.getElementById('BBB').style.display = 'none';
    document.getElementById('CCC').style.display = 'none';
    document.getElementById(tabname).style.display = 'block';
}
</script>
</head>

<body>
<div class="tabbox">
  <p class="tabs">
    <a href="#AAA" class="AAA" onclick="ChangeTab('AAA'); return false;">AAA</a>
    <a href="#BBB" class="BBB" onclick="ChangeTab('BBB'); return false;">BBB</a>
    <a href="#CCC" class="CCC" onclick="ChangeTab('CCC'); return false;">CCC</a>
  </p>
  <div id="AAA" class="tab">
    <iframe src="http://www.AAA.com/"></iframe>
  </div>
  <div id="BBB" class="tab">
    <iframe src="http://www.BBB.com/"></iframe>
  </div>
  <div id="CCC" class="tab">
    <iframe src="http://www.CCC.com/"></iframe>
  </div>
</div>

<script type="text/javascript">
  ChangeTab('AAA');
</script>

</body>
</html>
```

FIG.3B

LIST INFORMATION (GENERATION OF HTML SOURCE PROGRAM)

```
<html>
<body>
<iframe width=100% height=25% src="http://www.AAA.com/"></iframe>
<iframe width=100% height=25% src="http://www.BBB.com/"></iframe>
<iframe width=100% height=25% src="http://www.CCC.com/"></iframe>
</body>
</html>
```

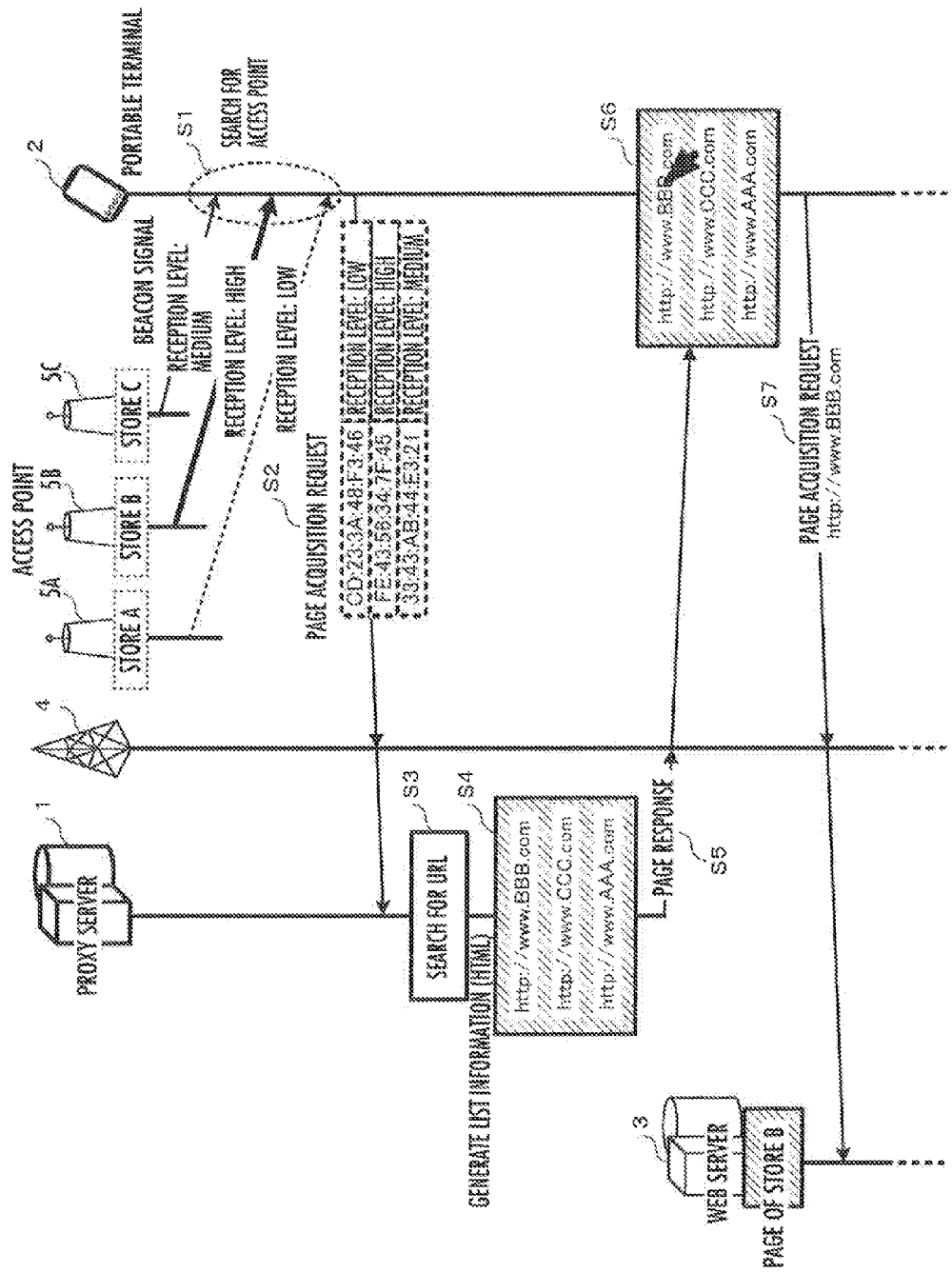

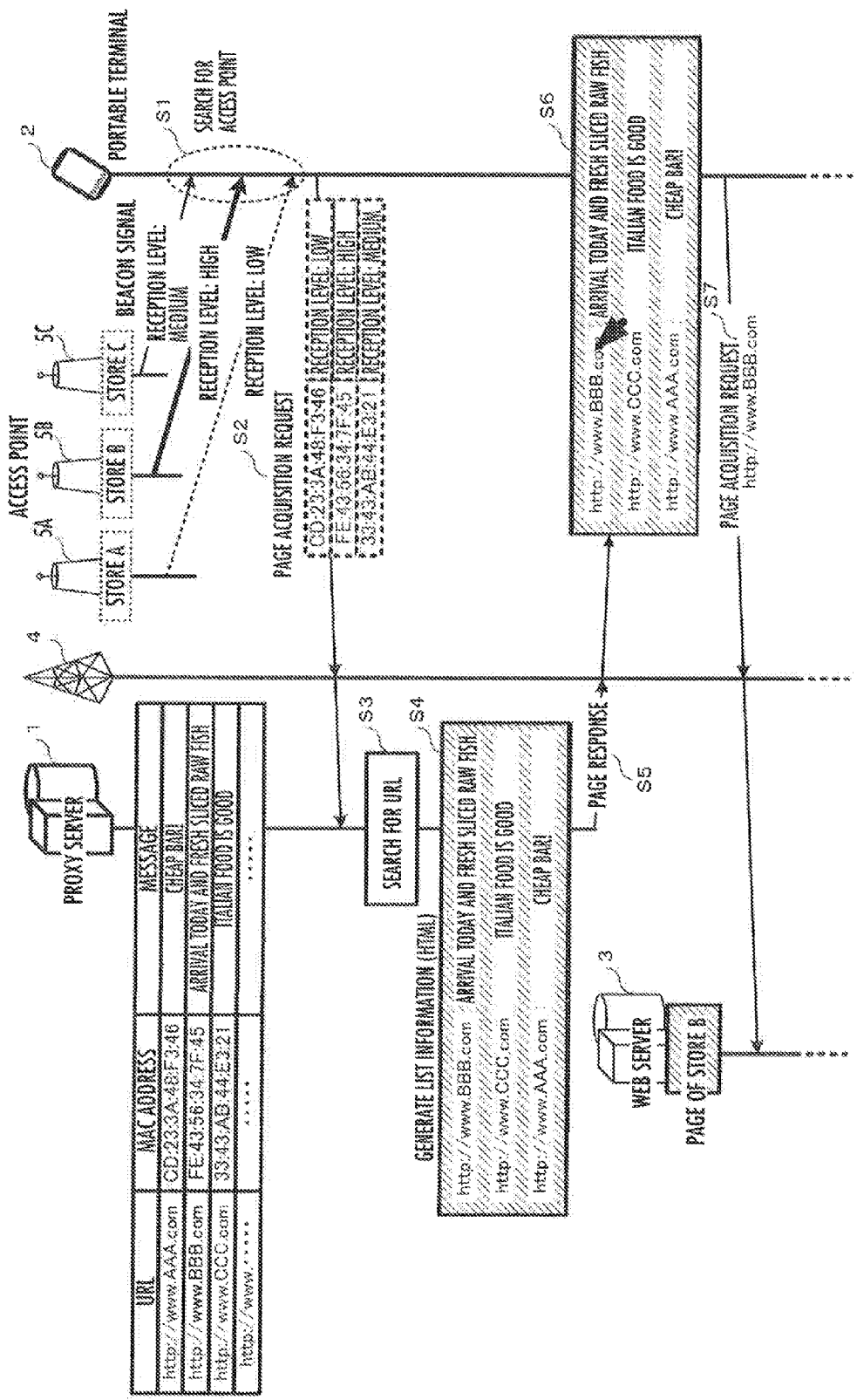

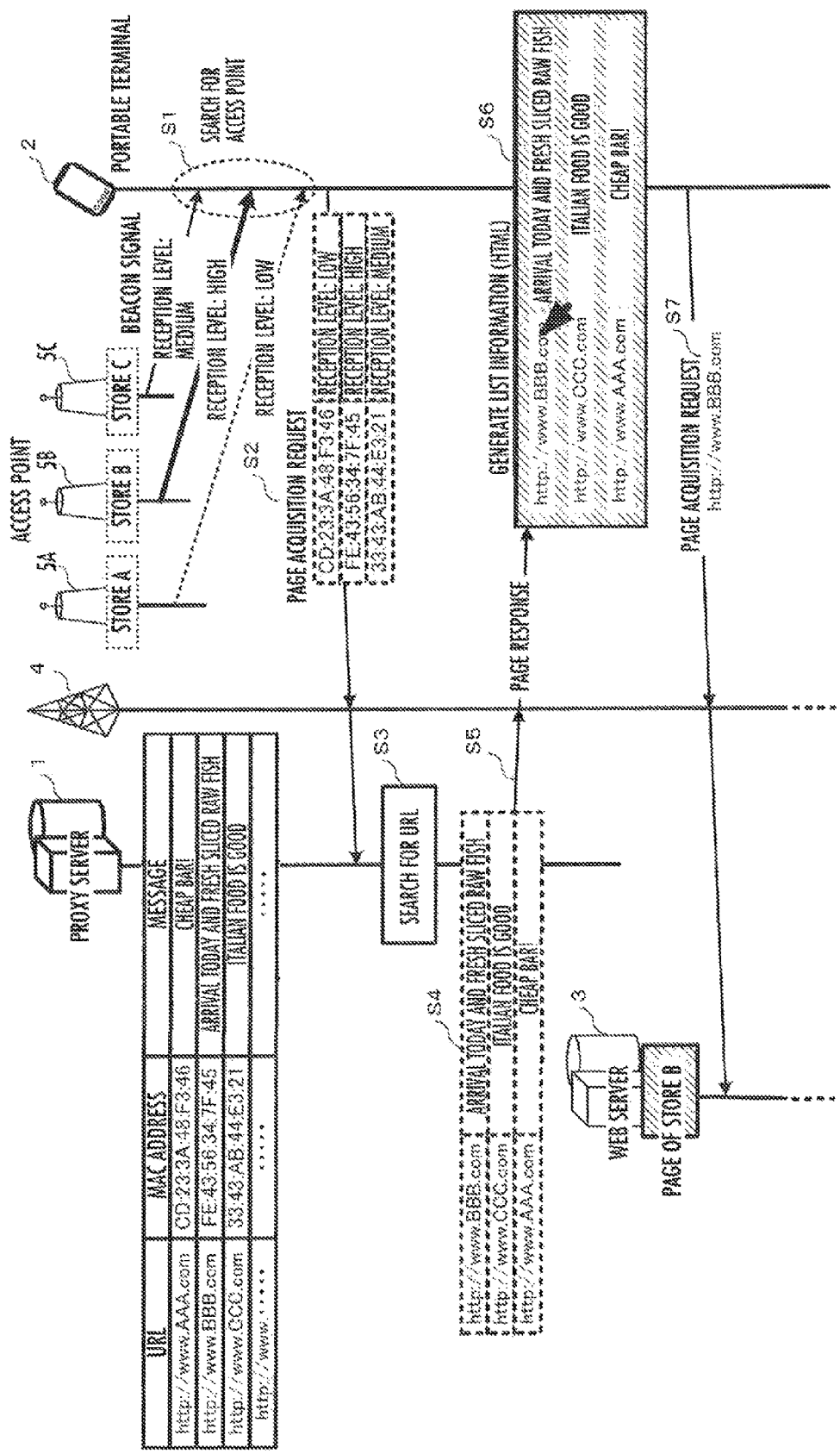

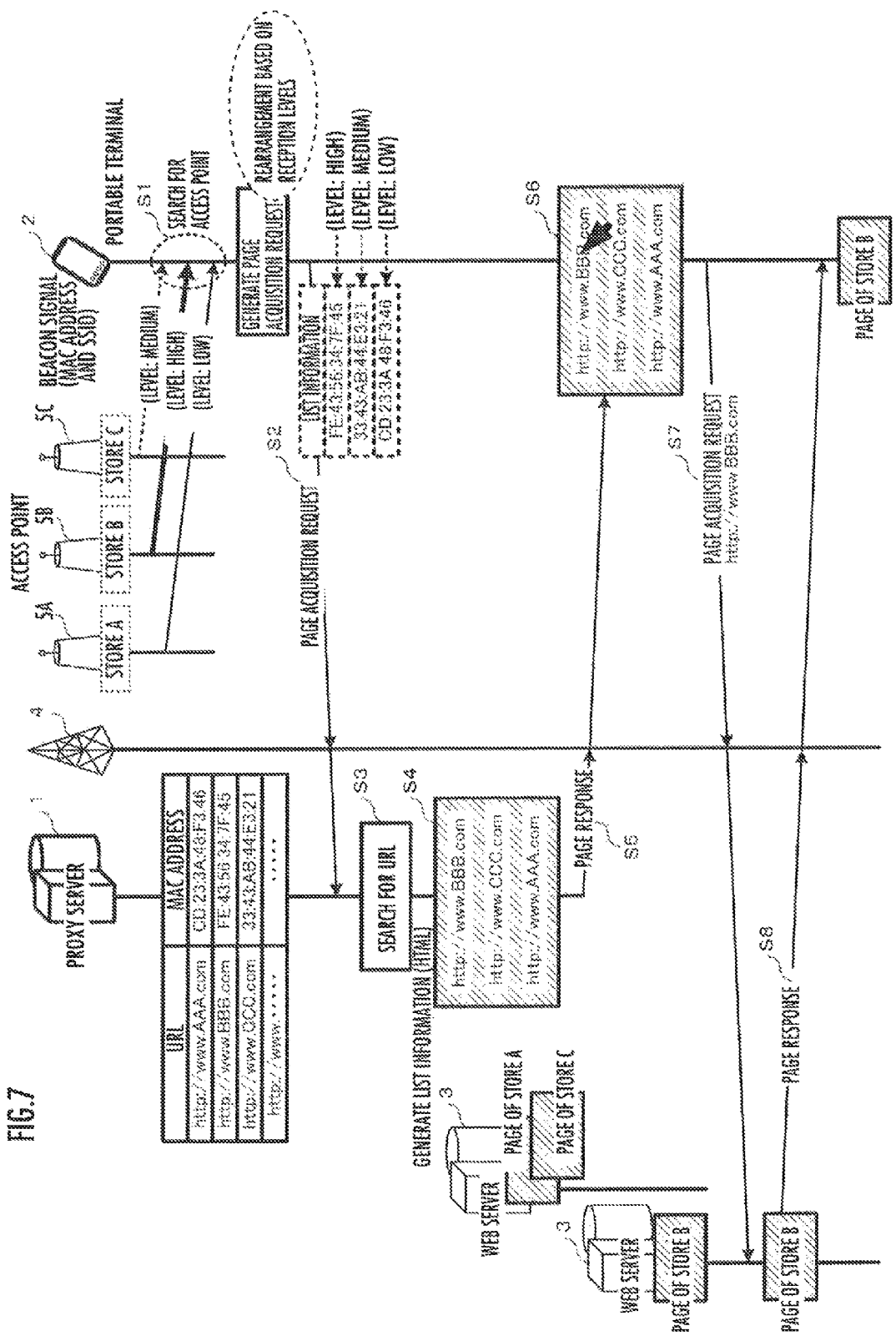

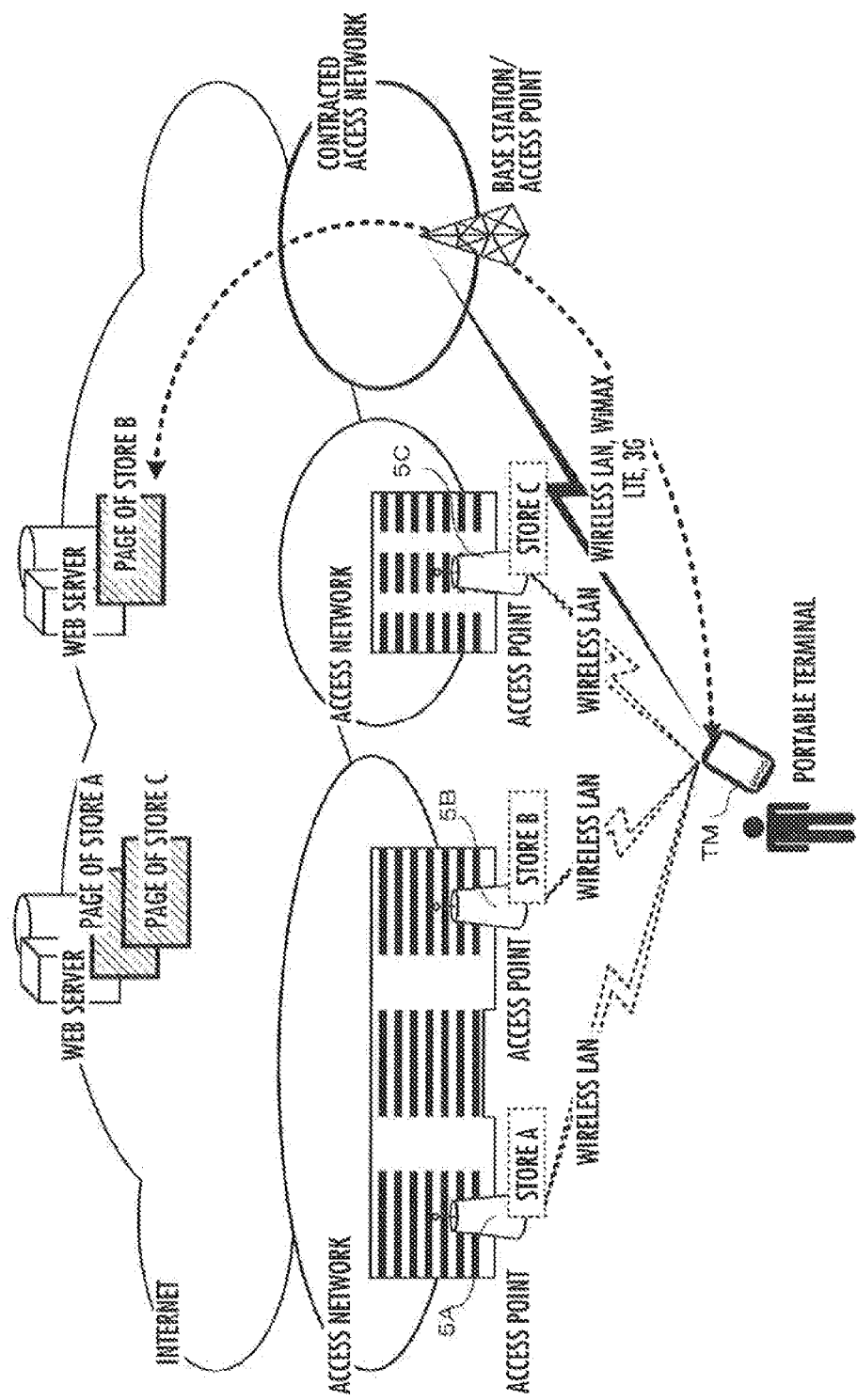

METHOD AND SYSTEM FOR CAUSING PORTABLE TERMINAL TO OBTAIN SITE PAGE OF WEB SERVER ASSOCIATED WITH CURRENT LOCATION

TECHNICAL FIELD

The present invention relates to a technique for causing a portable terminal to acquire a site page of a Web server through an access point.

This application claims under the Paris Convention the benefit of the priority of Japanese Patent Application No. 2012-278443 filed on Dec. 20, 2012 and Japanese Patent Application No. 2013-104572 filed on May 16, 2013, which are hereby incorporated by reference herein in its entirety for the purposes of PCT Rule 20.6.

BACKGROUND ART

With the development of the Internet, site pages of Web servers have become the important advertisement media of companies or stores. In general, it is considered that large companies want to make a large number of persons browse their Web sites, regardless of areas. At that time, when the Internet is used, the distance between the actual position of the company and the position of the user who accesses to the Web site is not significant in terms of the effect of advertisement.

In contrast, it is considered that small local stores want to make particularly persons, who reside in the area, browse their Web sites. For example, when the user uses, fir example, restaurants or fresh food stores, the user needs to actually visit the stores. Therefore, the Web site of the store is unnecessary for persons who are far away to visit the store.

FIG. 13 is a diagram illustrating the structure of a system according to the related art which causes a portable terminal to acquire site pages.

As illustrated in FIG. 13, stores A to C, which are the actual stores, are located at different positions or in different areas. Access points 5A, 5B and 5C are installed in the stores A, B, and C, respectively. In some cases, the access points are used for business in the stores or are used by the customers for purposes other than the business of the stores. In addition, each of the access points 5A to 5C is connected to the Internet which is a wide area network through an access network that contracts with the individual stores, for example, an optical network.

Each of the stores A to C contracts with a Web server operator which is installed on the Internet and publishes the site page of the store through the Web server. The site pages are pages which are the advertisement media of the stores A to C and are browsed by the customers to attract the customers.

As illustrated in FIG. 13, a portable terminal TM is located at the position where it can receive a beacon signal, which is an annunciation signal of a wireless local area network (LAN), from each of the access points 5A to 5C. In addition, the portable terminal TM can be connected to the Internet through the access network with which the user individually contracts. The access network with which the portable terminal TM contracts is not limited to the wireless LAN and may be, for example, a worldwide interoperability for microwave access (WiMAX) network, a long term evolution (LTE) network, or a 3rd generation (3G) network.

The user can search for neighboring access points using the portable terminal TM and find the access network which contracts with the user. Specifically, the portable terminal can receive the annunciation signals including the addresses of the access points from the neighboring access points and find the address of the access network which contracts with the user from the access points. For example, in the case of the wireless LAN, the annunciation signal is a beacon signal or a probe response. In response to an operation of the user, the portable terminal TM can be connected to an access point or a base station of the contracted access network.

The portable terminal TM is, for example, a smart phone or a tablet terminal and a Web browser is installed in the portable terminal TM such that the portable terminal TM renders the site pages on a display. The portable terminal TM is connected to the Internet through the access network which contracts with the user and accesses the site pages of the Web servers which contract with the stores A to C. Therefore, the user can browse the site pages.

For example, Patent Document 1 discloses an advertisement providing system in which a terminal receives a beacon signal transmitted from an access point, stores the history of a service set identifier (SSID) included in the beacon signal, transmits the history to a server, and receives advertisement information associated with the SSID from the server.

For example, Patent Document 2 discloses a technique in which a base station informs a terminal of a beacon signal including the address of a server and an identifier of the base station and the terminal receives the beacon signal, transmits a page acquisition request including the identifier of the base station to the address of the server, and acquires information about content distributed by the base station.

For example, Patent Document 3 discloses a technique in which a server stores area information corresponding to a position, an access point has the identification information of the position, and a wireless terminal transmits a request signal including the identification information of the position acquired from the access point to the server and acquires the area information.

CITATION LIST

Patent Document

Patent Document 1: JP 2009-188922 A
Patent Document 2: JP 2009-089003 A
Patent Document 3: JP 2005-027239 A

DISCLOSURE OF THE INVENTION

Problem to be Solved by the Invention

For example, in a business area or a downtown area, when the portable terminal searches for neighboring access points, a plurality of access points are actually searched. In this case, the user needs to perform an operation of selecting a desired access point from the searched access points while browsing a plurality of SSIDs. As in the techniques disclosed in the above-mentioned Patent Documents 1 to 3, even when content which corresponds to the identifier based on the position of the access point or the base station is received from the server, the user needs to perform an operation of selecting a desired access point.

In the techniques disclosed in Patent Documents 1 to 3, even when a person who keeps a small store wants to distribute a site page to the portable terminal, the user has a right to select any one of the SSIDs of a plurality of access points. The user can select only the access point which is a connection destination from a plurality of SSIDs. It is hardly possible for the user to acquire content based on a strange access point in terms of security. That is, in the conventional techniques disclosed in Patent Documents 1 to 3, the user of the portable terminal can acquire only the area information associated with the SSID of the previously known access point.

Accordingly, an object of the invention is to provide a method and system for causing a portable terminal to acquire site pages of Web servers associated with the current position even at a position where a plurality of access points are searched, without causing the user to make any selections.

Means for Solving the Problem

According to the invention, there is provided a page acquisition method performed in a system including a plurality of site servers that are connected to a wide area network, a plurality of access points that transmit annunciation signals including their addresses, a portable terminal that is connected to the wide area network and acquires pages from the site servers, and a proxy server that includes an address correspondence table in which an address of a site page is associated with an address of each access point and is connected to the wide area network. The method includes: a first step of allowing the portable terminal to search for the access points in a vicinity of the portable terminal, to receive the annunciation signal including the address of the access point from each access point, and to measure a reception level of the annunciation signal; a second step of allowing the portable terminal to transmit, to the proxy server, a page acquisition request including the address of each access point included in the annunciation signal and the measured reception level; a third step of allowing the proxy server to search for the address of the site page corresponding to the address of each access point included in the page acquisition request, using the address correspondence table; a fourth step of allowing the proxy server to generate list information in which the searched addresses of a plurality of site pages are arranged in descending order of the reception levels; a fifth step of allowing the proxy server to transmit the list information as a response to the portable terminal; and a sixth step of allowing the portable terminal to present the list information to a user and to transmit one or more page acquisition requests having one or more addresses as destinations to the corresponding site servers.

According to an embodiment of the page acquisition method of the invention, the proxy server may associate a message including a text and/or an image with each set of the address of the access point and the address of the site page in the address correspondence table. In the fourth step, the proxy server may describe the message so as to be associated with the address of each of the site pages arranged in the list information.

According to the embodiment of the page acquisition method of the invention, the proxy server may assign an update time to the message including the text and/or the image in the address correspondence table. In the fourth step, the proxy server may arrange the addresses of a plurality of site pages with the same reception level in the list information in reverse chronological order of the update time assigned to the corresponding message.

According to another embodiment of the page acquisition method of the invention, the list information may be a Web page in which the addresses of a plurality of site pages are arranged and the Web page may be generated by the proxy server in the fourth step or may be generated by the portable terminal in the sixth step.

According to still another embodiment of the page acquisition method of the invention, the address of the site page may be a uniform resource locator (URL), and the address of the access point may be a media access control (MAC) address or a service set identifier (SSID).

According to yet another embodiment of the page acquisition method of the invention, the annunciation signal which is received from each access point by the portable terminal in the first step may be a beacon signal or a probe response of a wireless local area network (LAN). In the second step, the page acquisition request may be a GET request based on a hyper text transport protocol (HTTP).

According to still yet another embodiment of the page acquisition method of the invention, the system may further include a charging control server that is connected to the wide area network. The charging control server may manage account information about a publisher of the site page and account information about an operator of the proxy server. When any one of the addresses arranged in the list information is selected and the page acquisition request is transmitted to the site servers, the portable terminal may transmit, to the charging control server, a charging instruction request to instruct the transmission of information about a predetermined amount of money from the account information based on the publisher of the site page to the account information based on the operator of the proxy server.

In the above-mentioned embodiment in which the charging control server is provided, when an address of a site page is added to the address of the access point in the address correspondence table, the proxy server may transmit, to the charging control server, a charging instruction request to instruct the transmission of information about a predetermined amount of money from account information about a publisher of the site page to the account information about the operator of the proxy server.

According to the invention, there is provided a page acquisition method performed in a system including a plurality of site servers that are connected to a wide area network, a plurality of access points that transmit annunciation signals including their addresses, a portable terminal that is connected to the wide area network and acquires pages from the site servers, and a proxy server that includes an address correspondence table in which an address of a site page is associated with an address of each access point and is connected to the wide area network. The method includes: a first step of allowing the portable terminal to search for the access points in a vicinity of the portable terminal, to receive the annunciation signal including the address of the access point from each access point, and to measure a reception level of the annunciation signal; a second step of allowing the portable terminal to transmit, to the proxy server, a page acquisition request including list information in which the addresses of a plurality of access points included in the annunciation signals are arranged in descending order of the reception levels; a third step of allowing the proxy server to search for the address of the site page corresponding to the address of each access point included in the page acquisition request, using the address correspondence table; a fourth step of allowing the proxy server to associate the searched address of the site page with the address of each access point in the list information; a fifth step of allowing the proxy server to transmit the list information, which is associated with the addresses of the site pages, as a response to the portable terminal; and a sixth step of allowing the portable terminal to present the received list information to a user and to transmit one or more page acquisition requests having one or more addresses as destinations to the corresponding site servers.

According to the invention, there is provided a system including: a plurality of site servers that are connected to a wide area network; a plurality of access points that transmit annunciation signals including their addresses; a portable terminal that is connected to the wide area network and acquires pages from the site servers; and a proxy server that is connected to the wide area network and includes an address correspondence table in which an address of a site page is associated with an address of each access point. The portable terminal includes: an annunciation signal receiving element that searches for the access points in a vicinity of the portable terminal, receives the annunciation signal including the address of the access point from each access point, and measures a reception level of the annunciation signal; a first page acquisition request transmission element that transmits, to the proxy server, a page acquisition request including the address of each access point included in the annunciation signal and the measured reception level; and a second page acquisition request transmission element that presents the list information to a user and transmits one or more page acquisition requests having one or more addresses as destinations to the corresponding site servers. The proxy server includes; an address search element that searches for the address of the site page corresponding to the address of each access point included in the page acquisition request, using the address correspondence table; a list information generation element that generates list information in which the searched addresses of a plurality of site pages are arranged; and a list information response element that transmits the list information as a response to the portable terminal.

According to the invention, there is provided a system including; a plurality of site servers that are connected to a wide area network; a plurality of access points that transmit annunciation signals including their addresses; a portable terminal that is connected to the wide area network and acquires pages from the site servers; and a proxy server that is connected to the wide area network and includes an address correspondence table in which an address of a site page is associated with an address of each access point. The portable terminal includes; an annunciation signal receiving element that searches for the access points in the vicinity of the portable terminal, receives the annunciation signal including the address of the access point from each access point, and measures a reception level of the annunciation signal; a first page acquisition request transmission element that transmits, to the proxy server, a page acquisition request including list information in which the addresses of a plurality of access points included in the annunciation signals are arranged in descending order of the reception levels; and a second page acquisition request transmission element that presents the received list information to a user and transmits one or more page acquisition requests having one or more addresses as destinations to the corresponding site servers. The proxy server includes; an address search element that searches for the address of the site page corresponding to the address of each access point included in the page acquisition request, using the address correspondence table; a list information generation element that associates the searched address of the site page with the address of each access point in the list information; and a list information response element that transmits the list information, which is associated with the addresses of the site pages, as a response to the portable terminal.

Effect of the Invention

According to the method and system of the invention, even at a position where a plurality of access points are searched, a portable terminal can acquire site pages of Web servers associated with the current position, without requiring the user to select the site page.

BRIEF DESCRIPTION OF DRAWINGS

FIG. 3A is a diagram illustrating an example of an HTML source program as list information;

FIG. 3B is a diagram illustrating another example of the HTML source program as the list information;

FIG. 4 is a sequence diagram illustrating a second embodiment of the page acquisition method according to the invention;

FIG. 5 is a sequence diagram illustrating a third embodiment of the page acquisition method according to the invention;

FIG. 6 is a sequence diagram illustrating a fourth embodiment of the page acquisition method according to the invention;

FIG. 7 is a sequence diagram illustrating a fifth embodiment of the page acquisition method according to the invention;

FIG. 13 is a diagram illustrating the structure of a system according to the related art which causes a portable terminal to acquire a site page.

MODE(S) FOR CARRYING OUT THE INVENTION

Hereinafter, some exemplary embodiments of the invention will be described in detail with reference to the drawings.

Figure 1:
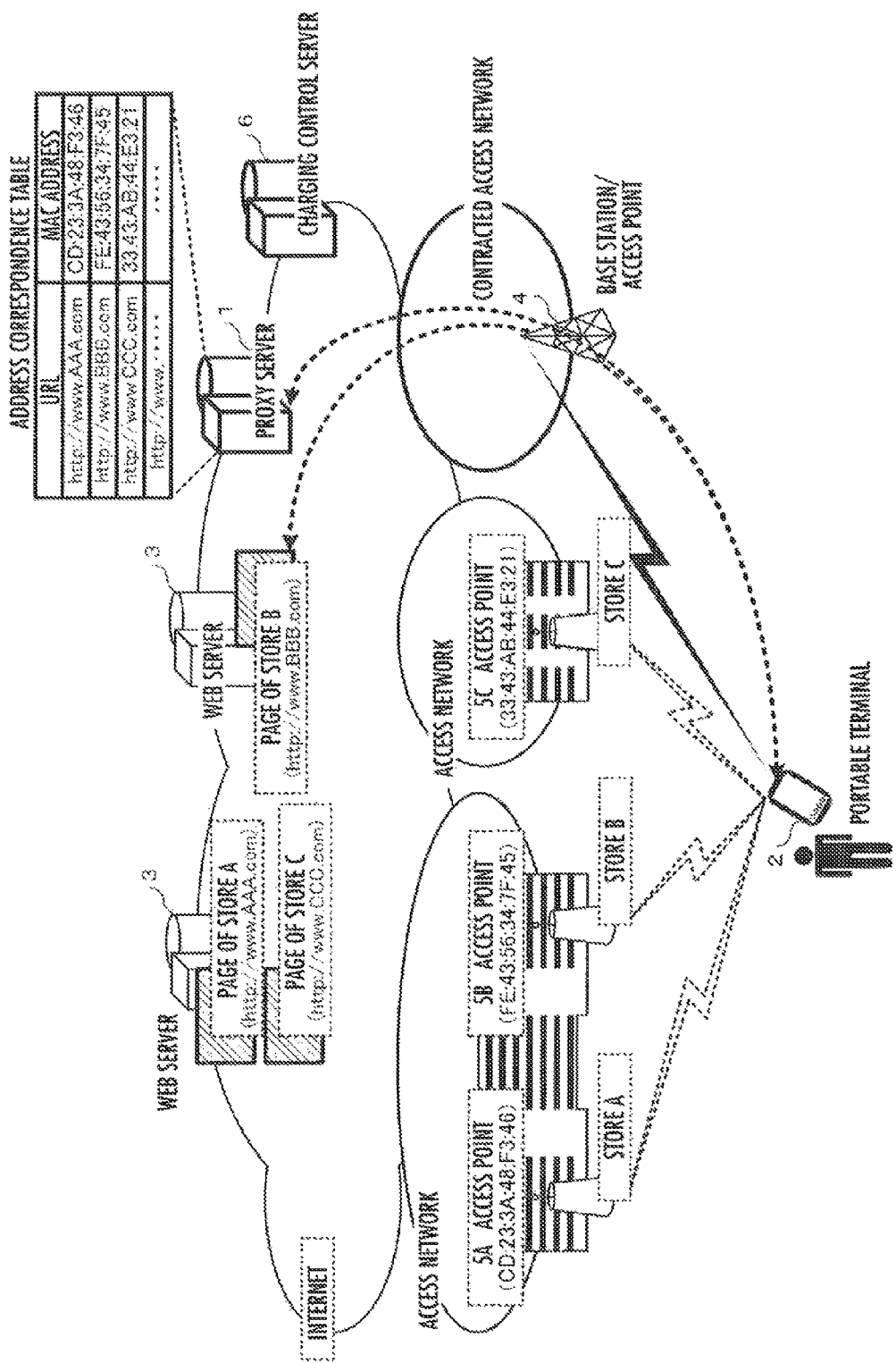
FIG. 1 is a diagram schematically illustrating an embodiment of a system according to the invention.

FIG. 1 is a diagram schematically illustrating an example of a system according to the invention.

In FIG. 1, similarly to FIG. 13, access points 5A, 5B, and 5C are installed in stores A, B, and C, respectively. In addition, a portable terminal 2 stays at a position where it can receive a beacon signal, which is an annunciation signal of a wireless LAN, from each of the access points 5A to 5C. The portable terminal 2 can be connected to the Internet through an access network with which the user of the portable terminal 2 contacts individually. The access network with which the portable terminal 2 contacts is not limited to the wireless LAN. For example, the access network may be a worldwide interoperability for microwave access (WiMAX) network, a long term evolution (LTE) network, or a 3rd generation (3G) network. The portable terminal 2 is, for example, a smart phone or a tablet terminal. For example, a Web browser is installed in the portable terminal 2 so as to render the site pages of the stores A to C on a display.

A unique media access control (MAC) address and a service set identifier (SSID) which is given by the user are allocated to each access point. In general, the user who operates the portable terminal 2 recognizes the SSID and determines whether to perform connection to the access points. In addition, similarly to FIG. 13, the site pages, which are the advertisement media of each of the stores A to C, can be distributed by a Web server 3 on the Internet. A uniform resource locator (URL) is allocated as an address to the site page. In general, the user who operates the portable terminal 2 recognizes the URL and determines whether to access the site page.

As illustrated in FIG. 1, a "proxy server" 1 is connected to the Internet which is a wide area network. The portable terminal 2 of the user can access the proxy server 1 through a base station/access point 4. In addition, the proxy server 1 stores an "address correspondence table" in which the addresses of the site pages are associated with the addresses of the access points.

| [Address Correspondence Table] |
|---|
| (URL1) <-> (MAC address 1) |
| (URL2) <-> (MAC address 2) |
| (URL3) <-> (MAC address 3) |
| . . . |

However, in the address correspondence table, any of the MAC address and the SSID may be associated with the URL. However, the MAC address which is globally uniquely allocated is preferable. The reason is that, in some cases, the same SSID is allocated to different access points.

Similarly, as illustrated in FIG. 1, a "charging control server" 6 is also connected to the Internet. The charging control server 6 manages account information about a site page publisher and account information about a proxy server operator. When the sequence according to the invention is performed, the charging control server 6 can create a business model in which the site page publisher (storekeeper) pays a predetermined amount of money as an advertisement rate to the proxy server operator (a service provider according to the invention).

Figure 2:
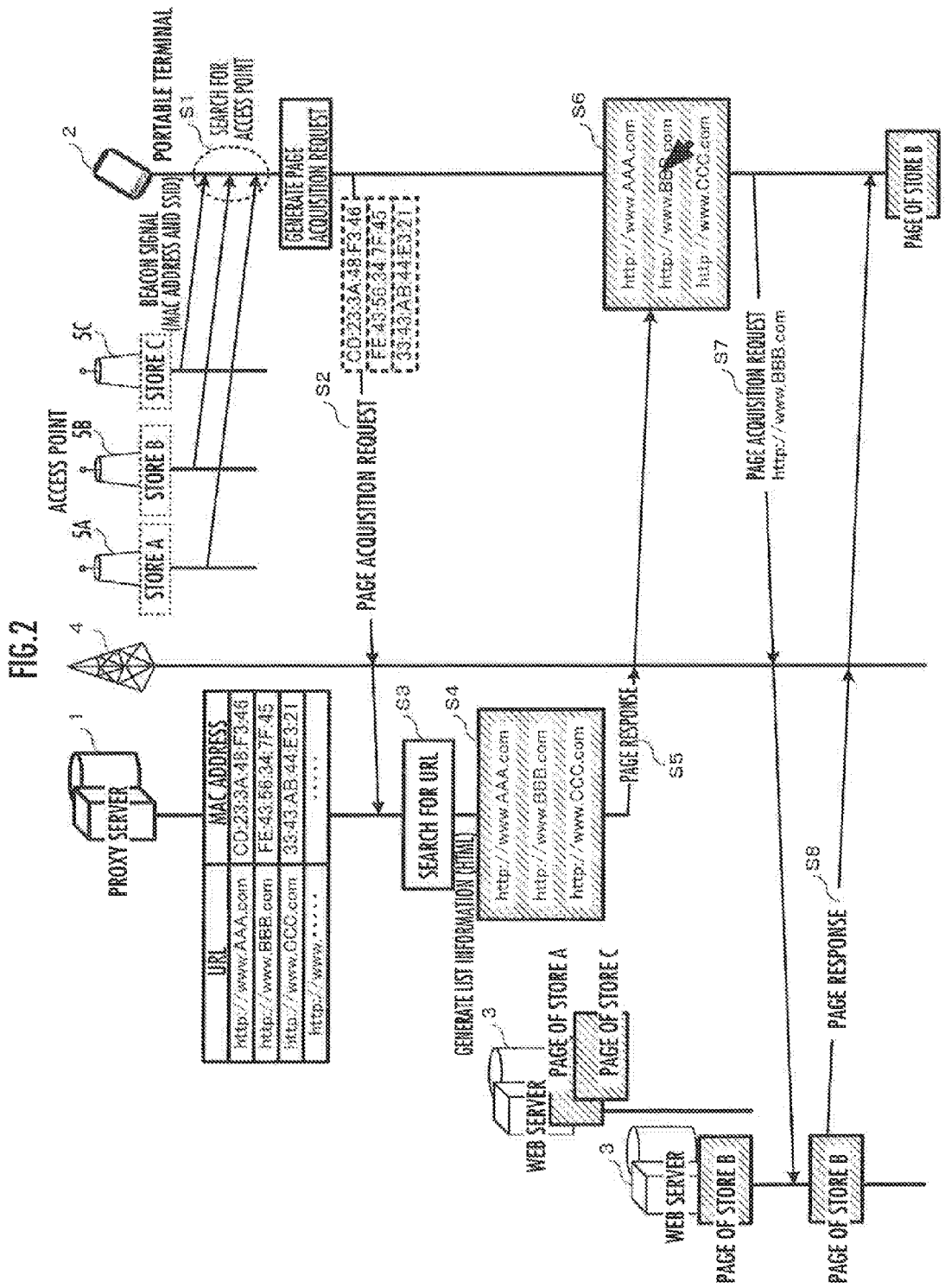
FIG. 2 is a sequence diagram illustrating a first embodiment of a page acquisition method according to the invention.

FIG. 2 is a sequence diagram illustrating a first embodiment of a page acquisition method according to the invention. Hereinafter, the content of each step in the sequence illustrated in FIG. 2 will be described.

(S1) The portable terminal 2 turns on a communication interface of the wireless LAN and searches for neighboring access points. The access points 5A to 5C installed in the stores A to C constantly broadcast the beacon signals including the MAC addresses and the SSIDs, which are their addresses, as the annunciation signals. The portable terminal 2 receives the beacon signals and recognizes that the access points 5A to 5C are present in the vicinity of the portable terminal 2.

Alternatively, the portable terminal 2 may broadcast a probe request to the neighboring access points and receive probe responses from the access points which have received the probe request. In this case, the portable terminal 2 receives the probe responses and recognizes that the access points 5A to 5C are present in the vicinity of the portable terminal 2.

The access points 5A to 5C are not necessarily connected to the Internet through the access network. The access points 5A to 5C preferably transmit at least the beacon signal or the probe response. The access point is not a characteristic component of the invention and is just the existing component.

(S2) The portable terminal 2 generates a "page acquisition request" including the addresses of a plurality of access points which are acquired by the reception of the beacon signals or the probe responses. As illustrated in FIG. 2, three addresses of the access points 5A to 5C are included in the page acquisition request. However, the addresses are not the designation of the page acquisition request and are included in a data portion of the page acquisition request. The page acquisition request is a GET request based on a hyper text transport protocol (HTTP). The portable terminal 2 transmits the page acquisition request to the proxy server 1.

However, it is assumed that the portable terminal 2 has known the URL of the proxy server 1. In addition, as illustrated in FIG. 2, it is assumed that three MAC addresses of the access points 5A to 5C are included in the data portion of the webpage acquisition request.

(S3) The proxy server 1 searches for a URL, which is the address of the site page corresponding to the address of each access point included in the received page acquisition request, using the "address correspondence table". As illustrated in FIG. 2, the following URLs of three site pages corresponding to three MAC addresses of the access points 5A to 5C are searched:

http://www.AAA.com/ (the address of the site page of the store A);

http://www.BBB.com/ (the address of the site page of the store B); and http://www.CCC.com/ (the address of the site page of the store C).

(S4) The proxy server 1 generates list information in which the searched addresses of a plurality of site pages are arranged. The list information includes the arranged addresses of a plurality of site pages. However, the list information may be configured in a hyper text markup language (HTML) source program.

FIGS. 3A and 3B illustrate simple examples of the HTML source program as the list information.

In the HTML source program illustrated in FIG. 3A, a store name A="AAA", a store name B="BBB", and a store name C="CCC" are displayed as arranged tabs on the browser and the user clicks any one of the tabs to select the store name. When the user clicks any one of the tabs, the site page corresponding to the tap is displayed on the browser.

In the HTML source program illustrated in FIG. 3B, the site page="http://www.AAA.com" of the store name A, the site page="http://www.BBB.com" of the store name B, and the site page="http://www.CCC.com" of the store name C are displayed on the browser so as to be horizontally arranged. In this case, the user does not click to select the site page and all of the site pages are displayed so as to be arranged horizontally and vertically.

Returning to FIG. 2, (S5) the proxy server 1 transmits the generated HTML source program as a response to the portable terminal 2. The HTML source program as the list information is included in a "page response", that is, a GET response based on the HTTP.

(S6) The portable terminal 2 is, for example, a smart phone or a tablet terminal and a WWW browser is installed in the portable terminal in advance. Therefore, the portable terminal 2 can immediately render the HTML source program as the list information included in the page response and display the HTML source program on the browser.

Here, when the HTML source program illustrated in FIG. 3A is received, the user can click and select the address (tab) of a desired page while browsing the list information displayed on the display of the portable terminal 2. In contrast, when the HTML source program illustrated in FIG. 3B is received, the same operation as that when the user implicitly clicks the addresses (tabs) of all of three pages is performed.

(S7) The portable terminal 2 transmits the page acquisition request, that is, the GET request in which the address of the site page selected by the user is the destination to the Web server storing the site page of the store. As illustrated in FIG. 2, for example, since the user clicks the address of the store B, the portable terminal 2 transmits the GET request in which the site page="http://www.BBB.com" of the store name B is the destination.

(S8) The Web server which stores the site page of the store name B receives the GET request and transmits a page response including the site page of the store name B to the portable terminal 2. Therefore, the user can browse the site page of the store B with the portable terminal 2.

FIG. 4 is a sequence diagram illustrating a second embodiment of the page acquisition method according to the invention.

As illustrated in FIG. 4, the portable terminal 2 measures the reception levels of the annunciation signals, unlike the embodiment illustrated in FIG. 2. Hereinafter, the content of each step in the sequence illustrated in FIG. 4 will be described.

(S1) The portable terminal 2 measures the reception levels of the beacon signals or the probe responses which are the annunciation signals. However, for example, the reception level of a received signal in the wireless LAN can be displayed in three to five stages in a bar graph shape according to an operating system (OS) installed in the smart phone or the tablet terminal. In this embodiment, as illustrated in FIG. 4, it is assumed that the reception levels of the beacon signals transmitted from the access points are as follows:

the access point 5A of the store A: a low reception level;

the access point 5B of the store B: a high reception level; and the access point 5C of the store C: a medium reception level.

Here, the reception level of the portable terminal 2 basically depends on the distance between the portable terminal 2 and the access point 5. That is, it is supposed that the store B is closest to the portable terminal 2, followed by the store C and the store A in this order.

(S2) When transmitting the page acquisition request to the proxy server 1, the portable terminal 2 inserts the association between each of the addresses of the access points and the reception levels of the annunciation signals transmitted from the access points into the data portion of the page acquisition request. As illustrated in FIG. 4, the addresses of the access points are associated with the reception levels as follows:

the MAC address of the access point 5A <-> a low reception level;

the MAC address of the access point 5B <-> a high reception level; and the MAC address of the access point 5C <-> a medium reception level.

(S3) Similarly to the embodiment illustrated in FIG. 2, the proxy server 1 searches for the URL of the site page corresponding to the MAC address of each access point included in the received page acquisition request, using the address correspondence table.

(S4) The proxy server 1 arranges the addresses of the site pages related to the access points in descending order of the reception levels to generate list information. As illustrated in FIG. 4, the addresses of the site pages are arranged in the following order, unlike the embodiment illustrated in FIG. 2:

the site page of store name B="http://www.BBB.com";

the site page of store name C="http://www.CCC.com"; and the site page of store name A="http://www.AAA.com".

(S5) Similarly to FIG. 2, the proxy server 1 transmits the HTML source program, which is the generated list information, as a response to the portable terminal 2.

(S6) The portable terminal 2 immediately renders the HTML source program as the list information included in the page response and displays the HTML source program on the browser. In this case, the user can recognize that the store having the site page with a higher rank is closer to the portable terminal 2 in the arranged list of the site pages. That is, the user can know the positions of the stores which are present in the vicinity of the user in the order of the stores closer to the user.

FIG. 5 is a sequence diagram illustrating a third embodiment of the page acquisition method according to the invention.

As illustrated in FIG. 5, in an "address correspondence table", a "message" is associated with each set of the address of the access point and the address of the site page, unlike the embodiments illustrated in FIGS. 2 and 4. The message includes a text and/or an image. As illustrated in FIG. 5, an advertising message, such as "cheap bar!" or "arrival today and fresh sliced raw fish", is described for each store.

As illustrated in FIG. 5, this embodiment is characterized by the process of Step S4, as compared to the embodiments illustrated in FIGS. 2 and 4. Therefore, Step S4 will be described below.

(S4) The proxy server 1 describes the message in the list information so as to be associated with the address of each of the arranged site pages.

Then, in Step S6, the user can browse the message for each store in the list of the site pages displayed on the portable terminal 2. That is, the user can browse desired stores among the stores which are present in the vicinity of the user in increasing order of the distance from the store and search for the desired stores at a glance.

As another embodiment, in the address correspondence table of the proxy server 1, it is preferable that an update time be additionally assigned to the message including the text and/or the image. This embodiment is characterized by the following Step S4.

(S4) The proxy server 1 arranges the addresses of a plurality of site pages with the same reception level in order from the newest update time in the list information.

Therefore, in Step S6, the user can browse the messages for each store in the list of the site pages displayed on the portable terminal 2 in increasing order of the distance from the store and in reverse chronological order of the update time. That is, the user can browse the store in which a new message has been described among the stores which are present in the vicinity of the user in increasing order of the distance from the store and search for the stores at a glance.

FIG. 6 is a sequence diagram illustrating a fourth embodiment of the page acquisition method according to the invention.

According to the embodiments illustrated in FIGS. 2, 4, and 5, in Step S4, the proxy server 1 generates the HTML source program as the list information.

In contrast, as illustrated in FIG. 6, in Step S4, the proxy server 1 generates only the information about the list of the addresses (URLs) of the site pages. The list information may include the message. Then, in Step S5, only the list information is transmitted to the portable terminal 2. Then, in Step S6, the portable terminal 2 generates an HTML source program on the basis of the received list information. Then, the portable terminal 2 immediately renders the HTML source program and displays the HTML source program on the browser. The recent smart phones or tablet terminals have high arithmetic processing capability. Therefore, an excessive load is not applied to the HTML source program generation process of the portable terminal 2. It is possible to reduce the amount of data of the page response between the proxy server 1 and the portable terminal 2 to maximize the communication rate.

Figure 8:
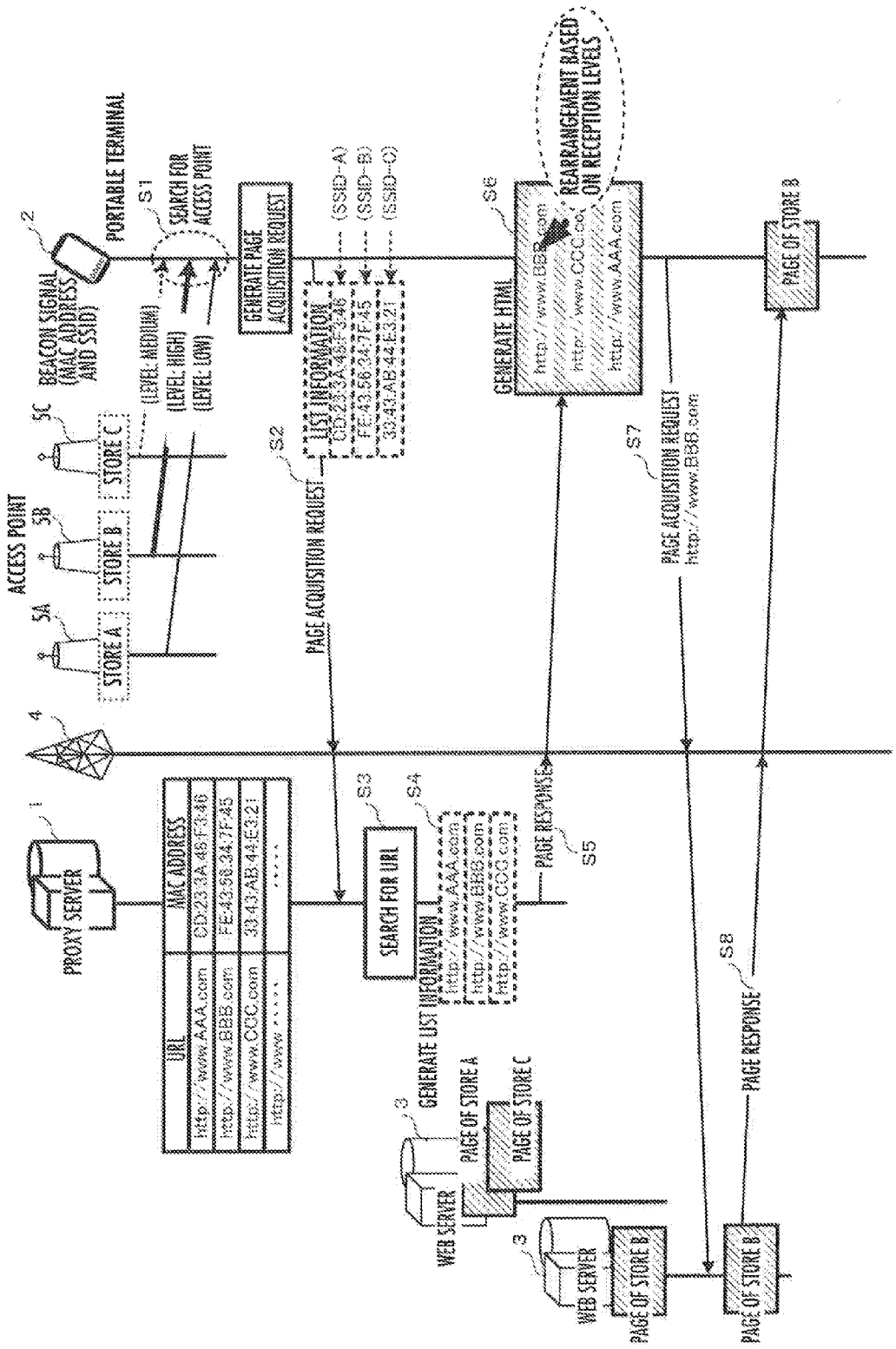
FIG. 8 is a sequence diagram illustrating a sixth embodiment of the page acquisition method according to the invention.

FIG. 7 is a sequence diagram illustrating a fifth embodiment of the page acquisition method according to the invention. FIG. 8 is a sequence diagram illustrating a sixth embodiment of the page acquisition method according to the invention. In the following description, each step of the sequence is common to two embodiments, unless otherwise specified.

(S1) The portable terminal 2 measures the reception levels of the beacon signals or the probe responses which are the annunciation signals. As illustrated in FIGS. 7 and 8, for example, it is assumed that the reception levels of the beacon signals transmitted from the access points are as follows:

the access point 5A of the store A: a low reception level;

the access point 5B of the store B: a high reception level; and the access point 5C of the store C: a medium reception level.

Here, the reception level of the portable terminal 2 basically depends on the distance between the portable terminal 2 and the access point 5. That is, it is supposed that the store B is closest to the portable terminal 2, followed by the store C and the store A in this order.

(S2) The portable terminal 2 generates a page acquisition request including "list information" in which the addresses of a plurality of access points acquired from the beacon signals or the probe responses are arranged.

Here, in the list information according to the embodiment illustrated in FIG. 7, for example, the addresses of three access points are rearranged in the descending order of the reception levels, as follows:

the MAC address of the access point 5B: a high reception level;

the MAC address of the access point 5C: a medium reception level; and the MAC address of the access point 5A: a low reception level.

In the list information according to the embodiment illustrated in FIG. 8, for example, the addresses of three access points are simply arranged as follows. However, the portable terminal 2 itself recognizes the reception level of each access point.

the MAC address of the access point 5A: a low reception level;

the MAC address of the access point 5B: a high reception level; and the MAC address of the access point 5C: a medium reception level.

Here, in both the embodiments illustrated in FIGS. 7 and 8, the list information is included in the data portion of the page acquisition request. The page acquisition request is a GET request based on the HTTP. The portable terminal 2 transmits the page acquisition request to the proxy server 1. However, it is assumed that the portable terminal 2 has previously known the URL of the proxy server 1.

(S3) The proxy server 1 searches for the address of each access point included in the list information of the received page acquisition request, for example, the address (URL) of the site page corresponding to the MAC address or the SSID, using the "address correspondence table".

(S4) The proxy server 1 associates the searched addresses of the site pages with the addresses of each access point in the received list information. As illustrated in FIGS. 7 and 8, the URLs of the site pages are associated with the addresses of the access points arranged in the list information, as follows:

the MAC address of the access point 5A: http://www.AAA.com;

the MAC address of the access point 5B: http://www.BBB.com; and the MAC address of the access point 5C: http://www.CCC.com.

According to the embodiment illustrated in FIG. 7, in the list information, the arrangement of the addresses of a plurality of site pages is implemented, for example, as a page image in the HTML source programs illustrated in FIGS. 3A and 3B. According to the embodiment illustrated in FIG. 8, the list information is the simple arrangement of the addresses of a plurality of site pages.

(S5) The proxy server 1 transmits the list information as a response to the portable terminal 2.

Here, in the embodiment illustrated in FIG. 7, the list information is an HTML source program. In the embodiment illustrated in FIG. 8, the list information is the simple arrangement of the addresses. In both the embodiments, the list information is included in a "page response", that is, a GET response based on the HTTP.

(S6) In Step S6, in the embodiment illustrated in FIG. 7, the portable terminal 2 can immediately render the HTML source program as the list information included in the page response and display the HTML source program on the browser. In the embodiment illustrated in FIG. 8, the portable terminal 2 rearranges the addresses of the site pages corresponding to the addresses of the access points in descending order of the reception levels in the list information. Then, for example, the portable terminal 2 makes up the HTML source programs as illustrated in FIGS. 3A and 3B from the list information in which the addresses of the site pages are rearranged. Then, the portable terminal 2 renders the HTML source program configured as the list information and displays the HTML source program on the browser. Since the recent smart phone or tablet terminal has high arithmetic processing capability, an excessively large load is not applied to the HTML source program generation process of the portable terminal 2. Since the amount of data of the page response between the proxy server 1 and the portable terminal 2 is reduced, it is possible to maximize the communication rate.

At that time, the user can recognize that the store of the site page with a higher rank is closer to the portable terminal 2 in the list of the site pages arranged in the browser. That is, the user can know the stores which are present in the vicinity of the user in increasing order of the distance from the store.

In the embodiments illustrated in FIGS. 7 and 8, when the HTML source program illustrated in FIG. 3A is used, the user can click the address (tab) of a desired page while browsing the list information displayed on the display of the portable terminal 2. In contrast, when the HTML source program illustrated in FIG. 3B is used, the same operation as that when the user implicitly clicks the addresses (tabs) of all of three pages is performed.

(S7) The portable terminal 2 transmits the page acquisition request, that is, the GET request in which the address of the website page selected by the user is the destination to the Web server storing the site page of the store. As illustrated in FIGS. 7 and 8, for example, since the user clicks the address of the store B, the portable terminal 2 transmits the GET request in which the site page="http://www.BBB.com" of the store name B is the destination.

(S8) The Web server which stores the site page of the store name B receives the GET request and transmits a page response including the site page of the store name B to the portable terminal 2. Therefore, the user can browse the site page of the store B with the portable terminal 2.

Figure 9:
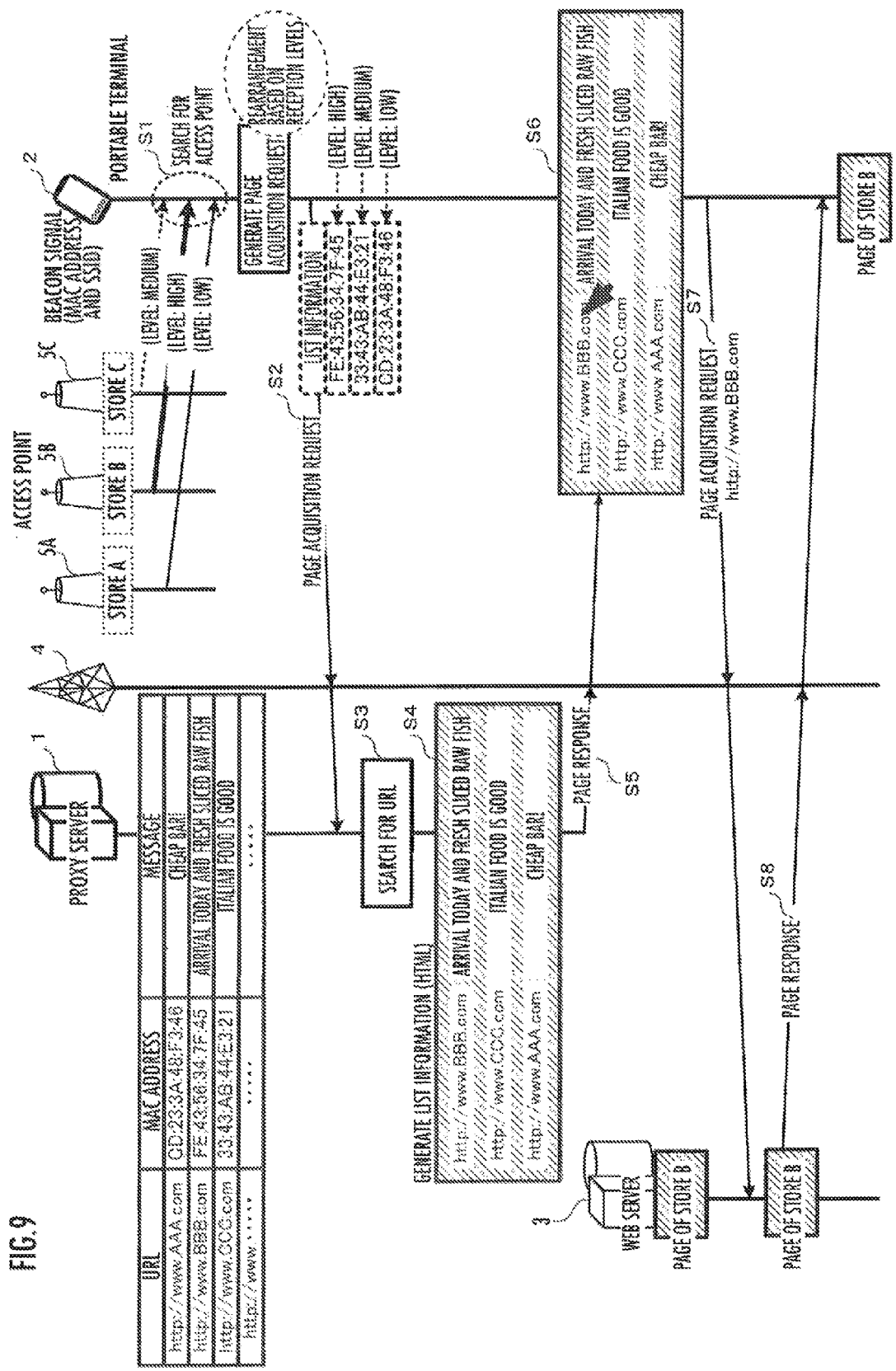
FIG. 9 is a sequence diagram illustrating a seventh embodiment corresponding to the embodiment illustrated in FIG. 7.
Figure 10:
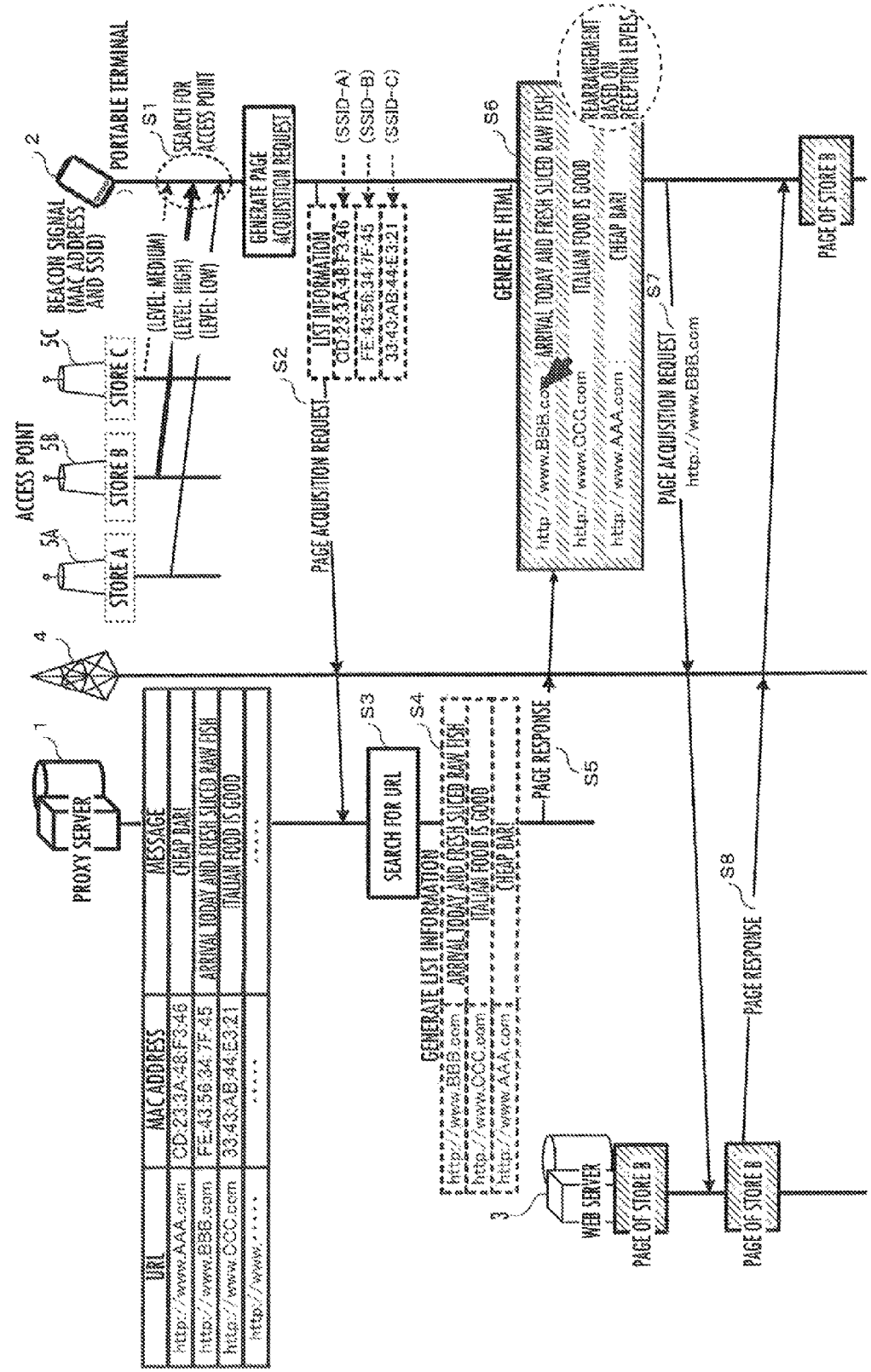
FIG. 10 is a sequence diagram illustrating an eighth embodiment corresponding to the embodiment illustrated in FIG. 8.

FIG. 9 is a sequence diagram illustrating a seventh embodiment corresponding to the embodiment illustrated in FIG. 7. FIG. 10 is a sequence diagram illustrating an eighth embodiment corresponding to the embodiment illustrated in FIG. 8. In the following description, each step of the sequence is common to the two embodiments, unless otherwise specified.

As illustrated in FIGS. 9 and 10, in an "address correspondence table", a "message" is associated with each set of the address of the access point and the address of the site page, unlike the embodiments illustrated in FIGS. 7 and 8. The message includes a text and/or an image. As illustrated in FIGS. 9 and 10, an advertising message, such as "cheap pub!" or "arrival today and fresh sliced raw fish", is described for each store.

The embodiment illustrated in FIG. 9 differs from the embodiment illustrated in FIG. 7 only in the process of Step S4 and the embodiment illustrated in FIG. 10 differs from the embodiment illustrated in FIG. 8 only in the process of Step S4. Therefore, Step S4 which is common to FIGS. 9 and 10 will be described below.

(S4) The proxy server 1 describes the message in the list information so as to be associated with the address of each of the arranged site pages.

Then, in Step S6, the user can also browse the message for each store in the list of the site pages displayed on the portable terminal 2. That is, the user can browse desired stores among the stores which are present in the vicinity of the user in increasing order of the distance from the store and search for the desired stores at a glance.

As another embodiment, in the address correspondence table of the proxy server 1, it is preferable that an update time be additionally assigned to the message including the text and/or the image. This embodiment is characterized by the following Step S4.

(S4) The proxy server 1 arranges the addresses of a plurality of site pages with the same reception level in reverse chronological order of the update time in the list information.

Therefore, in Step S6, the user can browse the message for each store in the list of the site pages displayed on the portable terminal 2 in increasing order of the distance from the store and in reverse chronological order of the update time. That is, the user can browse the store in which a new message has been described among the stores which are present in the vicinity of the user in increasing order of the distance from the store and search for the stores at a glance.

Figure 11:
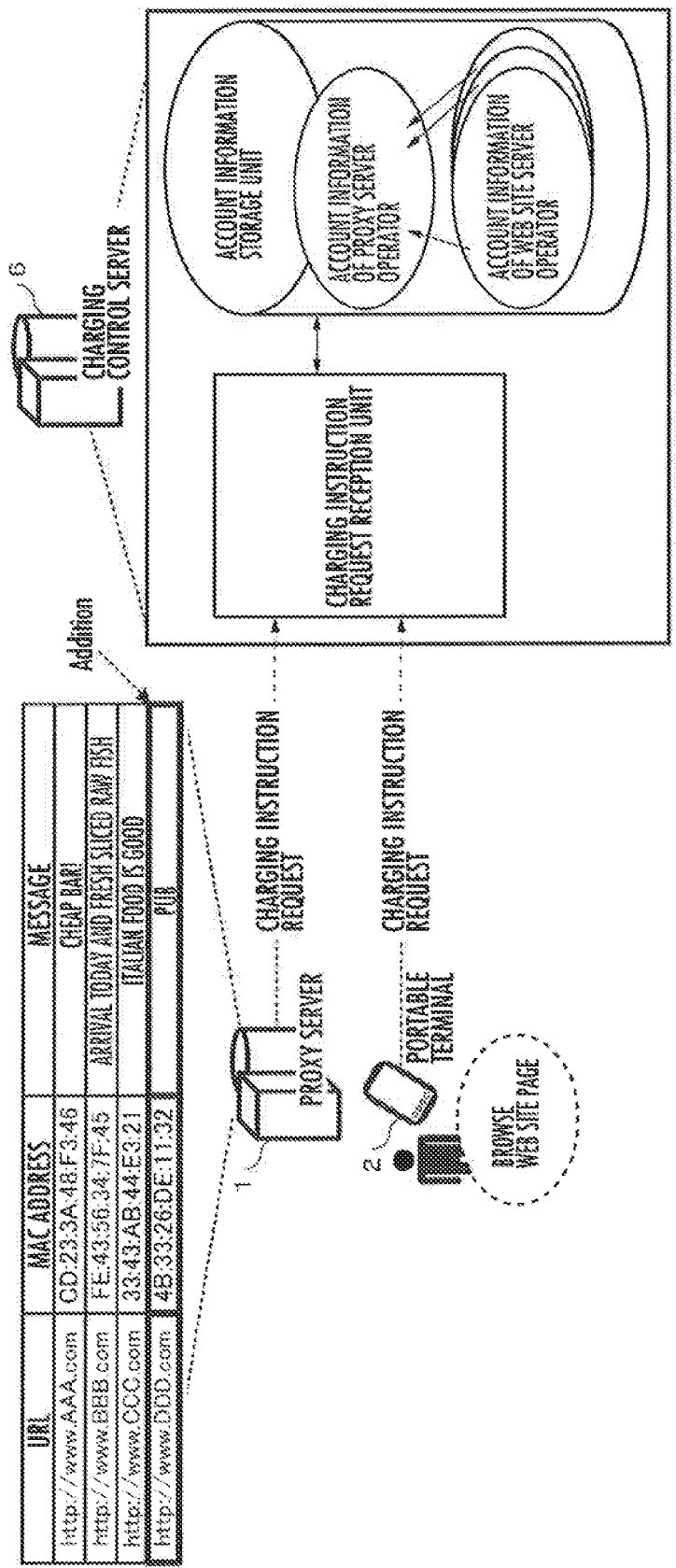
FIG. 11 is a functional diagram illustrating a charging control server according to the invention.

FIG. 11 is a diagram illustrating the function of the charging control server according to the invention.

The charging control server 6 creates a business model in which the site page publisher (storekeeper) pays a predetermined amount of money as an advertisement rate to the proxy server operator (a service provider in the invention). Hereinafter, two model sequences will be described.

(First Model Sequence)

In the above-mentioned Step S7, when the user selects any one of the addresses in the list information, the portable terminal 2 transmits the page acquisition request to the Web server 3. In this case, the portable terminal 2 also transmits a "charging instruction request" to the charging control server 6. The charging instruction request is an instruction to transmit information about a predetermined amount of money from account information about the site page publisher to account information about the proxy server operator.

It is preferable to insert a control code for transmitting the charging instruction request when the HTML source program is generated in Step S4. For example, it is preferable to insert the control code such that the portable terminal 2 transmits the following URL to the proxy server 1:

http://www.proxy.com/billing/AAA/PROXY/100

The URL instructs a proxy server "www.proxy.com" to transmit information about a predetermined amount of money "100 yen" from account information about a site page publisher AAA to account information about a proxy server operator PROXY.

(Second Model Sequence)

The proxy server 1 stores the address correspondence table. When the site page publisher (storekeeper) additionally registers a URL and a MAC address in the access correspondence table, the proxy server 1 transmits a "charging instruction request" to the charging control server 6. The charging instruction request is an instruction to transmit information about a predetermined amount of money from account information about the site page publisher to account information about the proxy server operator. A control code for transmitting the charging instruction request may be the same as that in the URL.

Figure 12:
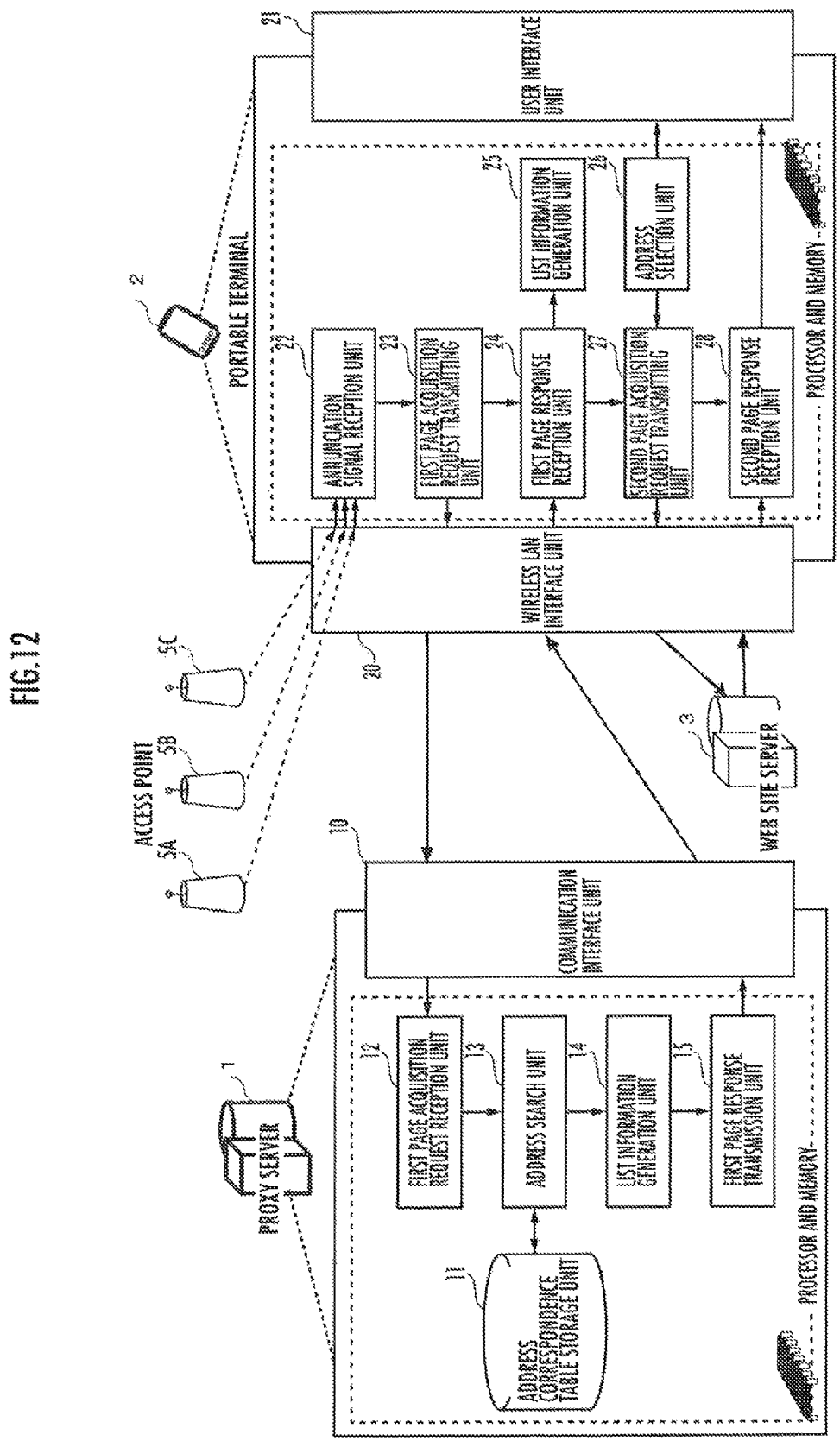
FIG. 12 is a functional diagram illustrating an embodiment of a proxy server and a portable terminal according to the invention.

FIG. 12 is a functional block diagram illustrating an embodiment of the proxy server and the portable terminal according to the invention.

[Portable Terminal 2]

As illustrated in FIG. 12, the portable terminal 2 includes a wireless LAN interface unit 20 connected to a wireless LAN, a user interface unit 21 such as a touch panel display, an annunciation signal reception unit 22, a first page acquisition request transmission unit 23, a first page response reception unit 24, a list information generation unit 25, an address selection unit 26, a second page acquisition request transmission unit 27, and a second page response reception unit 28. The functional components of the portable terminal 2 except for the wireless LAN interface unit 20 and the user interface unit 21 are implemented by executing a program which causes a computer provided in the portable terminal 2 to operate.

The annunciation signal reception unit 22 searches for the access points which are present in the vicinity of the portable terminal and receives the annunciation signal including the address of the access point from each access point (see the above-mentioned Step S1). The address included in the annunciation signal is output to the first page acquisition request transmission unit 23.

The first page acquisition request transmission unit 23 transmits the page acquisition request including the addresses of a plurality of access points included in the annunciation signals to the proxy server 1 (see the above-mentioned Step S2). In the embodiments illustrated in FIGS. 7 and 9, the page acquisition request including the list information in which the addresses of a plurality of access points included in the annunciation signals are arranged in descending order of the reception levels is transmitted to the proxy server 1. In the embodiments illustrated in FIGS. 8 and 10, the page acquisition request including the list information in which the addresses of a plurality of access points included in the annunciation signals are arranged is transmitted to the proxy server.

The first page response reception unit 24 receives the page response including the list information from the proxy server 1 (see the above-mentioned Step S6). The received list information is output to the list information generation unit 25.

The list information generation unit 25 generates the HTML source program from the list information in Step S6 of the embodiment illustrated in FIG. 6. As in the embodiments illustrated in FIGS. 2, 4, and 5, when the list information is the HTML source program generated by the proxy server 1, no process is performed. In addition, in Step S6 of the embodiments illustrated in FIGS. 8 and 10, the list information generation unit 25 arranges the addresses of a plurality of site pages corresponding to the addresses of the access points in descending order of the reception levels in the list information to generate the HTML source program from the list information. As in the embodiments illustrated in FIGS. 7 and 9, when the list information is the HTML source program generated by the proxy server 1, no process is performed. The HTML source program is output to the address selection unit 26.

The address selection unit 26 renders the input HTML source program and displays the HTML source program on the browser through the user interface unit 21. Here, the portable terminal waits until the user clicks and selects any one of the addresses of the site pages (see the above-mentioned Step S6). The selected address of the site page is output to the second page acquisition request transmission unit 27. However, when the HTML source program illustrated in FIG. 3B is used, the process is performed assuming that all of the site pages of the list information are selected by the user The second page acquisition request transmission unit 27 transmits each of the page acquisition requests having one or more addresses as the destinations to the Web server 3 (see the above-mentioned Step S7).

The second page response reception unit 28 receives a page response including the site page from the Web server 3 and renders the site page such that the user browses the site page through the user interface unit 21 (see the above-mentioned Step S8).

[Proxy Server 1]

As illustrated in FIG. 12, the proxy server 1 includes a communication interface unit 10 connected to the Internet which is a wide area network, an address correspondence table storage unit 11, a first page acquisition request unit 12, an address search unit 13, a list information generation unit 14, and a first page response transmission unit 15. The functional components of the proxy server 1 except for the communication interface unit 10 are implemented by executing a program that causes a computer provided in the server 1 to operate.

The address correspondence table storage unit 11 stores the address correspondence table in which the addresses of the site pages are associated with the addresses of the access points (see the access correspondence table illustrated in FIG. 1).

The first page acquisition request unit 12 receives the page acquisition request including the addresses of a plurality of access points from the portable terminal 2. The received addresses of the access points are output to the address search unit 13.

The address search unit 13 searches for the addresses of the site pages corresponding to the addresses of the access points included in the page acquisition request using the address correspondence table (see the above-mentioned Step S3). The searched addresses of the site pages are output to the list information generation unit 14.

The list information generation unit 14 generates the list information in which the searched addresses of a plurality of site pages are arranged in Step S4 of the embodiments illustrated in FIGS. 2, 4, 5, and 6. Here, as illustrated in Step S4 of FIGS. 2, 4, and 5, the HTML source program may be further generated from the list information. In contrast, as in the embodiment illustrated in FIG. 6, when the portable terminal 2 generates the HTML source program from the list information, no process is performed. In addition, the list information generation unit 14 associates the searched addresses of a plurality of site pages with the addresses of the access points in the list information in Step 4 of the embodiments illustrated in FIGS. 7 to 10. Here, as illustrated in Step S4 of FIGS. 7 and 9, the HTML source program may be further generated from the list information. In contrast, as in the embodiments illustrated in FIGS. 8 and 10, when the portable terminal 2 generates the HTML source program from the list information, no process is performed. The generated HTML source program is output to the first page response transmission unit 15.

The first page response transmission unit 15 transmits a page response including the list information to the portable terminal 2 (see the above-mentioned Step S5).

As described in detail above, according to the method and system of the invention, the portable terminal can acquire the site pages of the Web servers related to the current position even at the position where a plurality of access points are searched, without the user selecting the site page.

For example, the method and system according to the invention can be useful when the user searches for a desired store in the vicinity of the station. The user of the portable terminal can see a list of the addresses of the site pages of various stores in increasing order of the distance from the position of the user only by turning on the communication interface of the wireless LAN and searching for the access points which are present in the vicinity of the user. Then, the user can browse the site page of the store only by clicking any one of the addresses. In contrast, the storekeeper may perform only the operation of registering the MAC address or SSID of the access point and the URL of the site page in the proxy server according to the invention so that a plurality of persons who stay in the vicinity of the store browse the site page.

Those skilled in the art can readily change, modify, and omit the above-described embodiments of the invention, without departing from the technical scope and spirit of the invention. The above-described embodiments are illustrative and the invention is not limited to the above-described embodiments. The invention is limited only to the claims and equivalents thereof.

EXPLANATIONS NUMERALS

1 PROXY SERVER
10 COMMUNICATION INTERFACE UNIT
11 ADDRESS CORRESPONDENCE TABLE STORAGE UNIT
12 FIRST PAGE ACQUISITION REQUEST TRANSMISSION UNIT
13 ADDRESS SEARCH UNIT
14 LIST INFORMATION GENERATION UNIT
15 FIRST PAGE RESPONSE TRANSMISSION UNIT
2 PORTABLE TERMINAL
20 WIRELESS LAN INTERFACE UNIT
21 USER INTERFACE UNIT
22 ANNUNCIATION SIGNAL RECEPTION UNIT
23 FIRST PAGE ACQUISITION REQUEST TRANSMISSION UNIT
24 FIRST PAGE RESPONSE RECEPTION UNIT
25 LIST INFORMATION GENERATION UNIT
26 ADDRESS SELECTION UNIT
27 SECOND PAGE ACQUISITION REQUEST TRANSMISSION UNIT
28 SECOND PAGE RESPONSE RECEPTION UNIT
3 WEB SERVER
4 CONTRACTED BASE STATION/ACCESS POINT
5 ACCESS POINT
6 CHARGING CONTROL SERVER

The invention claimed is:

1. A page acquisition method performed in a system including a plurality of site servers that are connected to a wide area network, a plurality of access points that transmit annunciation signals including their addresses, a portable terminal that is connected to the wide area network and acquires pages from the site servers, and a proxy server that includes an address correspondence table in which an address of a site page is associated with an address of each access point and the proxy server is connected to the wide area network, the method comprising:
  a first step of wherein the portable terminal searches for the access points in a vicinity of the portable terminal, receives the annunciation signal including the address of the access point from each access point, and measures a reception level of the annunciation signal;
  a second step wherein the portable terminal transmits, to the proxy server, a page acquisition request including the address of each access point included in the annunciation signal and the measured reception level;
  a third step wherein the proxy server searches the address correspondence table to obtain an address of the site page corresponding to the address of each access point included in the page acquisition request received by the proxy server, using the address correspondence table;
  a fourth step wherein the proxy server generates list information in which the searched addresses of a plurality of site pages are arranged in descending order of the reception levels;
  a fifth step wherein the proxy server transmits the list information as a response to the portable terminal; and
  a sixth step wherein the portable terminal presents the list information to a portable terminal user and transmits one or more page acquisition requests having one or more addresses as destinations to the corresponding site servers, without requiring the portable terminal user to select the site page among various possible site pages.

2. The page acquisition method according to claim 1, wherein the proxy server associates a message including at least one of a text and an image with each set of the address of the access point and the address of the site page in the address correspondence table, and
in the fourth step, the proxy server describes the message so as to be associated with the address of each of the site pages arranged in the list information.

3. The page acquisition method according to claim 1, wherein the list information is a Web page in which the addresses of the plurality of site pages are arranged, and the Web page is generated by the proxy server in the fourth step or is generated by the portable terminal in the sixth step.

4. The page acquisition method according to claim 1, wherein the address of the site page is a uniform resource locator (URL), and
the address of the access point is a media access control (MAC) address or a service set identifier (SSID).

5. The page acquisition method according to claim 1, wherein the annunciation signal which is received from each access point by the portable terminal in the first step is a beacon signal or a probe response of a wireless local area network (LAN), and
in the second step, the page acquisition request is a GET request based on a hyper text transport protocol (HTTP).

6. A page acquisition method performed in a system including a plurality of site servers that are connected to a wide area network, a plurality of access points that transmit annunciation signals including their addresses, a portable terminal that is connected to the wide area network and acquires pages from the site servers, and a proxy server that includes an address correspondence table in which an address of a site page is associated with an address of each access point and the proxy server is connected to the wide area network, the method comprising:
  a first step of wherein the portable terminal searches for the access points in a vicinity of the portable terminal, receives the annunciation signal including the address of the access point from each access point, and measures a reception level of the annunciation signal;
  a second step wherein the portable terminal transmits, to the proxy server, a page acquisition request including the address of each access point included in the annunciation signal and the measured reception level;
  a third step wherein the proxy server searches the address correspondence table to obtain an address of the site page corresponding to the address of each access point included in the page acquisition request received by the proxy server, using the address correspondence table;
  a fourth step wherein the proxy server generates list information in which the searched addresses of a plurality of site pages are arranged in descending order of the reception levels;
  a fifth step wherein the proxy server transmits the list information as a response to the portable terminal; and
  a sixth step wherein the portable terminal presents the list information to a user and transmits one or more page acquisition requests having one or more addresses as destinations to the corresponding site servers,
wherein:
  the proxy server associates a message including at least one of a text and an image with each set of the address of the access point and the address of the site page in the address correspondence table, in the fourth step, the proxy server describes the message so as to be associated with the address of each of the site pages arranged in the list information, the proxy server assigns an update time to the message including at least one of the text and the image in the address correspondence table, and in the fourth step, the proxy server arranges the addresses of the plurality of site pages with the same reception level in the list information in reverse chronological order of the update time assigned to the corresponding message.

7. A page acquisition method performed in a system including a plurality of site servers that are connected to a wide area network, a plurality of access points that transmit annunciation signals including their addresses, a portable terminal that is connected to the wide area network and acquires pages from the site servers, and a proxy server that includes an address correspondence table in which an address of a site page is associated with an address of each access point and the proxy server is connected to the wide area network, the method comprising:

a first step of wherein the portable terminal searches for the access points in a vicinity of the portable terminal, receives the annunciation signal including the address of the access point from each access point, and measures a reception level of the annunciation signal;

a second step wherein the portable terminal transmits, to the proxy server, a page acquisition request including the address of each access point included in the annunciation signal and the measured reception level;

a third step wherein the proxy server searches the address correspondence table to obtain an address of the site page corresponding to the address of each access point included in the page acquisition request received by the proxy server, using the address correspondence table;

a fourth step wherein the proxy server generates list information in which the searched addresses of a plurality of site pages are arranged in descending order of the reception levels;

a fifth step wherein the proxy server transmits the list information as a response to the portable terminal; and a sixth step wherein the portable terminal presents the list information to a user and transmits one or more page acquisition requests having one or more addresses as destinations to the corresponding site servers;

wherein:

a charging control server is connected to the wide area network of the system, the charging control server manages account information about a publisher of the site page and account information about an operator of the proxy server, and when any one of the addresses arranged in the list information is selected and the page acquisition request is transmitted to the site server, the portable terminal transmits, to the charging control server, a charging instruction request to instruct transmission of information about a predetermined amount of money from the account information based on the publisher of the site page to the account information based on the operator of the proxy server.

8. The page acquisition method according to claim 7, wherein, when an address of a site page is added to the address of the access point in the address correspondence table, the proxy server transmits, to the charging control server, a charging instruction request to instruct the transmission of information about the predetermined amount of money from account information about the publisher of the site page to the account information about the operator of the proxy server.

9. A page acquisition method performed in a system including a plurality of site servers that are connected to a wide area network, a plurality of access points that transmit annunciation signals including their addresses, a portable terminal that is connected to the wide area network and acquires pages from the site servers, and a proxy server that includes an address correspondence table in which an address of a site page is associated with an address of each access point and the proxy server is connected to the wide area network, the method comprising:

a first step of allowing the portable terminal to search for the access points in a vicinity of the portable terminal, to receive the annunciation signal including the address of the access point from each access point, and to measure a reception level of the annunciation signal;

a second step of allowing the portable terminal to transmit, to the proxy server, a page acquisition request including list information in which the addresses of a plurality of access points included in the annunciation signals are arranged in descending order of the reception levels;

a third step wherein the proxy server searches the address correspondence table to obtain an address of the site page corresponding to the address of each access point included in the page acquisition request received by the proxy server, using the address correspondence table;

a fourth step of allowing the proxy server to associate the searched address of the site page with the address of each access point in the list information;

a fifth step of allowing the proxy server to transmit the list information, which is associated with the addresses of the site pages, as a response to the portable terminal; and a sixth step of allowing the portable terminal to present the received list information to a portable terminal user and to transmit one or more page acquisition requests having one or more addresses as destinations to the corresponding site servers, without requiring the portable terminal user to select the site page among various possible site pages.

10. A system comprising:

a plurality of site servers that are connected to a wide area network;

a plurality of access points that transmit annunciation signals including their addresses;

a portable terminal that is connected to the wide area network and acquires pages from the site servers; and a proxy server that is connected to the wide area network and includes an address correspondence table in which an address of a site page is associated with an address of each access point and stored, wherein the portable terminal includes:

an annunciation signal receiving element that searches for the access points in a vicinity of the portable terminal, receives the annunciation signal including the address of the access point from each access point, and measures a reception level of the annunciation signal;

a first page acquisition request transmission element that transmits, to the proxy server, a page acquisition request including the address of each access point included in the annunciation signal and the measured reception level; and a second page acquisition request transmission element that presents the list information to a portable terminal user and transmits one or more page acquisition requests having one or more addresses as destinations to the corresponding site servers, without requiring the portable terminal user to select the site page among various possible site pages, and the proxy server includes:

an address search element that searches the address correspondence table to obtain the address of the site page corresponding to the address of each access point included in the page acquisition request received by the proxy server, using the address correspondence table;

a list information generation element that generates list information in which the searched addresses of a plurality of site pages are arranged in descending order of the reception levels; and a list information response element that transmits the list information as a response to the portable terminal.

11. A system comprising:

a plurality of site servers that are connected to a wide area network;

a plurality of access points that transmit annunciation signals including their addresses;

a portable terminal that is connected to the wide area network and acquires pages from the site servers; and a proxy server that is connected to the wide area network and includes an address correspondence table in which an address of a site page is associated with an address of each access point and stored, wherein the portable terminal includes:

an annunciation signal receiving element that searches for the access points in a vicinity of the portable terminal, receives the annunciation signal including the address of the access point from each access point, and measures a reception level of the annunciation signal;

a first page acquisition request transmission element that transmits, to the proxy server, a page acquisition request including list information in which the addresses of a plurality of access points included in the annunciation signals are arranged in descending order of the reception levels; and a second page acquisition request transmission element that presents the received list information to a portable terminal user and transmits one or more page acquisition requests having one or more addresses as destinations to the corresponding site servers, without requiring the portable terminal user to select the site page among various possible site pages, and the proxy server includes:

an address search element that searches the address correspondence table to obtain the address of the site page corresponding to the address of each access point included in the page acquisition request received by the proxy server, using the address correspondence table;

a list information generation element that associates the searched address of the site page with the address of each access point in the list information; and a list information response element that transmits the list information, which is associated with the addresses of the site pages, as a response to the portable terminal.

* * * * *